United States Patent
Jain et al.

(10) Patent No.: US 11,875,357 B2
(45) Date of Patent: Jan. 16, 2024

(54) METHOD AND SYSTEM OF USING MINER COMMITMENT TO REWARD PROOFS

(71) Applicant: MASTERCARD INTERNATIONAL INCORPORATED, Purchase, NY (US)

(72) Inventors: Shubham Jain, Chhattisgarh (IN);
Yashika Sharma, Dwarka (IN);
Chandan Garg, Haryana (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 280 days.

(21) Appl. No.: 16/924,741

(22) Filed: Jul. 9, 2020

(65) Prior Publication Data

US 2022/0012733 A1 Jan. 13, 2022

(51) Int. Cl.
| | | |
|---|---|---|
| *G06Q 20/38* | (2012.01) | |
| *G06Q 20/06* | (2012.01) | |
| *H04L 9/32* | (2006.01) | |
| *H04L 9/08* | (2006.01) | |
| *H04L 67/10* | (2022.01) | |
| *G06Q 20/40* | (2012.01) | |
| *G06Q 30/08* | (2012.01) | |

(Continued)

(52) U.S. Cl.
CPC ......... *G06Q 20/405* (2013.01); *G06Q 20/065* (2013.01); *G06Q 30/08* (2013.01); *H04L 9/088* (2013.01); *H04L 9/3247* (2013.01); *H04L 9/50* (2022.05); *H04L 67/10* (2013.01); *G06Q 20/3829* (2013.01); *G06Q 40/04* (2013.01); *G06Q 2220/00* (2013.01); *H04L 9/3239* (2013.01); *H04L 9/3297* (2013.01); *H04L 2209/56* (2013.01)

(58) Field of Classification Search
CPC ......... G06F 16/27; H04L 67/10; H04L 9/088; H04L 9/3247; G06Q 20/065; G06Q 20/3829
USPC .......................................................... 705/71
See application file for complete search history.

(56) References Cited

U.S. PATENT DOCUMENTS

2008/0140726 A1* 6/2008 Aahlad ................. G06F 16/182
2017/0344435 A1* 11/2017 Davis ................... G06F 11/1464
(Continued)

OTHER PUBLICATIONS

Yaga, NIST.IR.8202 (Year: 2018).*
(Continued)

*Primary Examiner* — John W Hayes
*Assistant Examiner* — Wodajo Getachew
(74) *Attorney, Agent, or Firm* — Panitch Schwarze Belisario & Nadel LLP (57) ABSTRACT

A method and system for awarding blocks in a blockchain for mining based on commitment to a blockchain network. The method includes receiving, by a receiver of a processing server, a plurality of mining bids, where each mining bid is submitted by a blockchain node in a blockchain network and includes at least a declaration, the declaration being a period of time in which the blockchain node agrees to defer spending an earned mining fee; selecting, by a processor of the processing server, a winning bid of the plurality of mining bids based on at least the declaration included in each of the plurality of mining bids; and transmitting, by a transmitter of the processing server, a notification message to a winning blockchain node that submitted the winning bid.

18 Claims, 5 Drawing Sheets

(51) Int. Cl.
*H04L 9/00* (2022.01)
*G06Q 40/04* (2012.01)

(56) References Cited

U.S. PATENT DOCUMENTS

| | | | | |
|---|---|---|---|---|
| 2017/0344987 A1* | 11/2017 | Davis | .................... | H04L 9/3247 |
| 2018/0039667 A1* | 2/2018 | Pierce | .................... | H04L 9/3247 |
| 2018/0103117 A1* | 4/2018 | Mosko | .................... | H04L 67/10 |
| 2019/0303622 A1* | 10/2019 | Versteeg | .................... | H04L 9/50 |
| 2019/0318346 A1* | 10/2019 | Ben-David | ........... | H04L 9/3239 |
| 2020/0014745 A1* | 1/2020 | Thurimella | ........... | H04L 9/3239 |
| 2020/0082398 A1* | 3/2020 | Xu | ............................ | H04L 9/50 |
| 2020/0134578 A1* | 4/2020 | Shi | ........................ | G06Q 20/065 |
| 2020/0302433 A1* | 9/2020 | Green | .................... | G06Q 20/02 |
| 2020/0401445 A1* | 12/2020 | Zheng | .................... | G06F 9/485 |
| 2022/0029811 A1* | 1/2022 | Boneh | .................... | H04L 9/3218 |

OTHER PUBLICATIONS

Coin age _bitFlyer (Year: 2022).*
Bryan Ford, Untangling Mining Incentives in Bitcoin and ByzCoin—Home Page (Year: 2016).*
Pike, VeriCoinPoSTWhitePaper May 10, 2015 (Year: 2015).*
Pass, Hybrid Consensus: Efficient Consensus in the Permission less Model (Year: 2020).*
Ai, ABC: An Auction-Based Blockchain Consensus-Incentive Mechanism (Year: 2020).*
Nakamoto, Bitcoin: A Peer-to-Peer Electronic Cash System (Year: 2022).*
Coinbase Definition (Year: 2020).*
Definition of coinbase transaction _PCMag (Year: 2022).*
Delayed Blockchain Protocols (Year: 2018).*
Eyal, Majority is not Enough (Year: 2013).*
Paxos Agreement—Computerphile (Year: 2022).*
Seth, Proof of Activity Definition (Year: 2021).*
Cryptopedia Staff, What Are Proof of Stake and Delegated Proof of Stake? (Year: 2021).*
VeriCoin's Proof of Stake-Time Blockchain White-paper Explained Youtube (Year: 2023).*
PPCoin: Peer-to-Peer Crypto-Currency with Proof-of-Stake, Sunny King, Scott Nadal (Year: 2012).*
Proof of Stake-Time by Vericoin POST White Paper, Pike, Oct. 2019 (Year: 2019).*
Wang, B., Li, Z., & Li, H. (2020). Hybrid consensus algorithm based on modified proof-of-probability and DPoS. Future Internet, 12(8), 122. https://doi.org/10.3390/fi12080122 (Year: 2020).*
Saad, M., Qin, Z., Ren, K., Nyang, D. H., Mohaisen, D. (2021). e-pos: Making proof-of-stake decentralized and Fair. IEEE Transactions on Parallel and Distributed Systems, 32(8), 1961-1973. https://doi.org/10.1109/tpds.2020.3048853 (Year: 2021).*
Sunny King's Supernode Proof of Stake Consensus Complete Guide by MoonKing9998 (Year: 2019).*
Garay, J., Kiayias, A., & Leonardos, N. (2015). The bitcoin backbone protocol: Analysis and applications. Advances in Cryptology—EuroCrypt 2015, 281-310. https://doi.org/10.1007/978-3-662-46803-6_10 (Year: 2015).*
Kiayias, A., Russell, A., David, B., & Oliynykov, R. (2017). Ouroboros: A provably secure proof-of-stake Blockchain Protocol. Advances in Cryptology—Crypto 2017, 357-388. https://doi.org/10.1007/978-3-319-63688-7_12 (Year: 2017).*

* cited by examiner

METHOD AND SYSTEM OF USING MINER COMMITMENT TO REWARD PROOFS

FIELD

The present disclosure relates to a method and system of using miner commitment to reward proofs, and more particularly, a method and system for awarding blocks in the blockchain based on miners with a long-term commitment towards the network based on a declaration, the declaration being a period of time in which the miner agrees to defer spending an earned mining fee.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also providing anonymity as to the individuals or entities involved in a transaction. Blockchains often rely on miners that participate in confirming transactions, where miners generally operate on the collection of fees.

Majority of blockchain backed currencies are based on consensus algorithms like proof of work, proof of space, etc., which helps ensure that blockchain keeps growing through consensus amongst nodes. However, most of the consensus algorithms are rather expensive since they either require a large amount of electricity or a miner who owns a stockpile of a same currency. Generally, the more the miner is willing to spend, for example, on equipment, the greater the chances that the miner gets to mine the next block. The current consensus algorithms, however, have many drawbacks. Thus, there is a need for a technical system that encourages and incentivizes miners to commit to the blockchain network, for example, by awarding blocks in the blockchain to a miner (or blockchain node) who agrees to defer spending earned rewards or mining fees for a specified period of time.

SUMMARY

The present disclosure provides a description of systems and methods for awarding blocks in a blockchain for mining based on a miner's willingness to delay or defer spending of rewards, for example, the mining fee. In accordance with an embodiment, a processor in the blockchain may collect all of the bids and select one of the bids as a winning bid, where the selection can be based on the bids willing to delay or defer the spending of the reward or mining fee being afforded the node. In addition, the longer the delay or deferment of the spending of the reward or fee can also provide the miner with a higher chance of being selected and to be validated by other eligible miners. The winning bid that is selected enables the associated node to mine the next block or number of blocks based and wherein the reward or fee therefrom is not immediately redeemable. The result is that nodes are encouraged to delay or defer the spending of the fees they collect or earn, since their ability to continue to mine blocks, and thus collect revenue, would be reduced if the miner or node is unwilling to defer spending their collected fees. This will, in turn, benefit miner and blockchain nodes that commit to the network. The present disclosure explains one way for carrying out this incentive plan on a computer system that is more efficient than others.

A method is disclosed for awarding blocks in a blockchain for mining based on commitment to a blockchain network, comprising: receiving, by a receiver of a processing server, a plurality of mining bids, where each mining bid is submitted by a blockchain node in a blockchain network and includes at least a declaration, the declaration being a period of time in which the blockchain node agrees to defer spending an earned mining fee; selecting, by a processor of the processing server, a winning bid of the plurality of mining bids based on at least the declaration included in each of the plurality of mining bids; and transmitting, by a transmitter of the processing server, a notification message to a winning blockchain node that submitted the winning bid.

A system is disclosed for awarding blocks in a blockchain for mining based on commitment, the system comprising: a blockchain network comprised of a plurality of blocks; and a processing server configured to: receive a plurality of mining bids, where each mining bid is submitted by a blockchain node in the blockchain network and includes at least a declaration, the declaration being a period of time in which the blockchain node agrees to defer spending an earned mining fee; select a winning bid of the plurality of mining bids based on at least the declaration included in each of the plurality of mining bids; and transmit a notification message to a winning blockchain node that submitted the winning bid.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Awarding Blocks Based on Long-Term Commitment Towards Network

Figure 1:
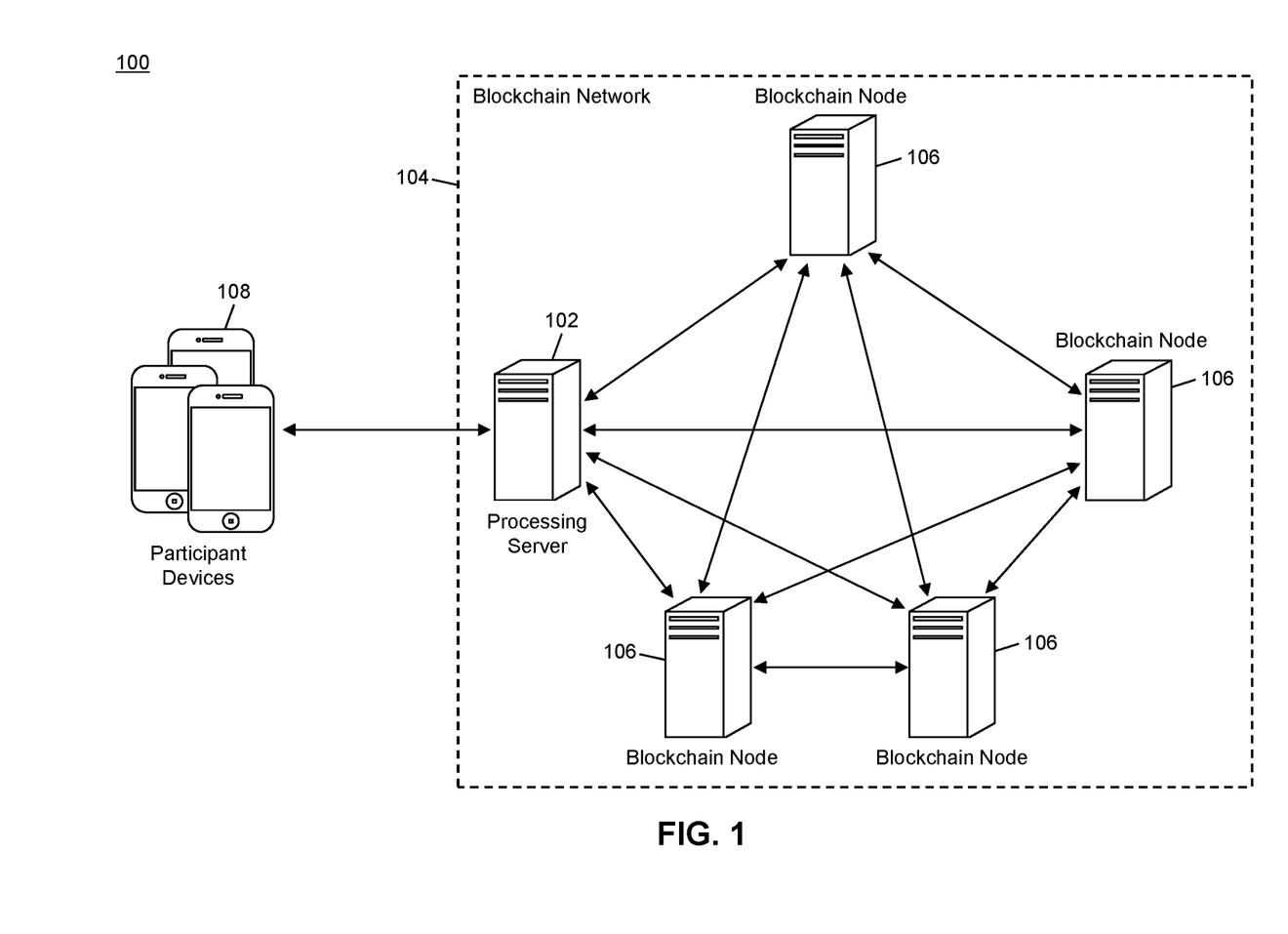
FIG. 1 is a block diagram illustrating a high level system architecture for awarding blocks for mining in a blockchain based on commitment towards a network in accordance with exemplary embodiments.

FIG. 1 illustrates a system 100 for awarding blocks for mining in a blockchain based on commitment towards network.

The system 100 may include a processing server 102. The processing server 102, discussed in more detail below, may be configured to award blocks for mining for a blockchain associated with a blockchain network 104. The blockchain network 104 may be comprised of a plurality of blockchain nodes 106. In some cases, the processing server 102 may be a blockchain node 106 and/or configured to perform the functions associated therewith. For instance, the blockchain nodes 106 may agree to select one or more nodes to operate as processing servers 102 for the collection of bids and selection of winning bids, as discussed below. In an exemplary embodiment, the collection of bids and selection process may be automatic, and may utilize rules agreed on by each blockchain node 106 in the blockchain network, such as following the same consensus rules used for the blockchain.

Figure 2:
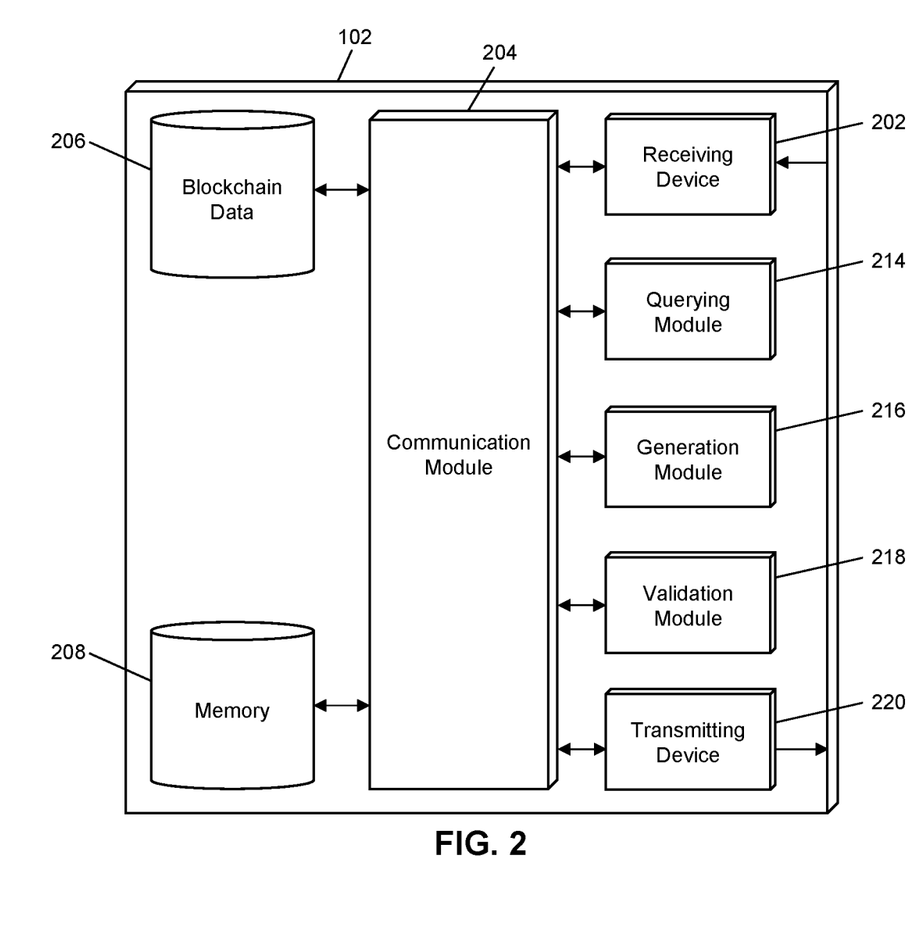
FIG. 2 is a block diagram illustrating the processing server of the system of FIG. 1 for awarding blocks for mining in a blockchain based on commitment towards a network in accordance with exemplary embodiments.
Figure 5:
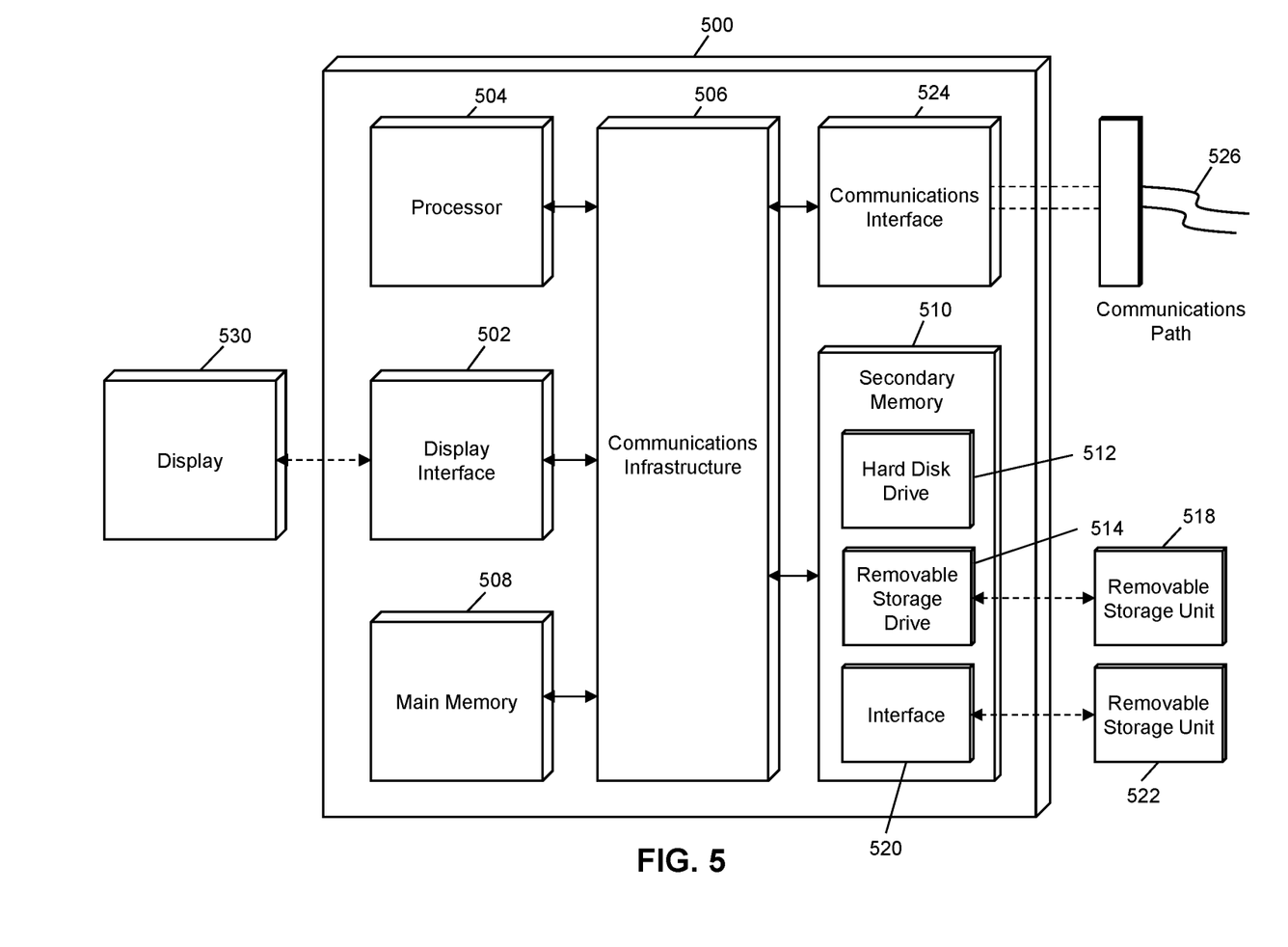
FIG. 5 is a block diagram illustrating a computer system architecture in accordance with exemplary embodiments.

Each blockchain node 106 may be a computing system, such as illustrated in FIG. 2 and FIG. 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (for example, UNIX timestamp, DateTime, etc.). The block reference value may be a value that references an earlier block (for example, based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 104 prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" may refer specifically to the private key. In other cases, the term "blockchain wallet" may refer to a computing device (for example, participant devices 108) that stores the private key for use thereof in blockchain transactions. For instance, each computing device may each have their own private key for respective cryptographic key pairs, and may each be a blockchain wallet for use in transactions with the blockchain associated with the blockchain network. Computing devices may be any type of device suitable to store and specifically programmed to utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain may correspond to a blockchain transaction or other storage of data, as applicable. A blockchain transaction may consist of at least: a digital signature of the sender of currency (for example, a first participant device 108) that is generated using the sender's private key, a blockchain address of the recipient of currency (for example, a second participant device 108) generated using the recipient's public key, and a blockchain currency amount that is transferred or other data being stored. In some blockchain transactions, the transaction may also include one or more blockchain addresses of the sender where blockchain currency is currently stored (for example, where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction may also include the sender's public key, for use by an entity in validating the transaction. For the traditional processing of a blockchain transaction, such data may be provided to a blockchain node 106 in the blockchain network 104, either by the sender or the recipient. The node may verify the digital signature using the public key in the cryptographic key pair of the sender's wallet and also verify the sender's access to the funds (for example, that the unspent transactions have not yet been spent and were sent to address associated with the sender's wallet), and then include the blockchain transaction in a new block. The new block may be validated by other nodes in the blockchain network 104 before being added to the blockchain and distributed to all of the blockchain nodes 106 in the blockchain network 104 in traditional blockchain implementations. In cases where a blockchain data value may not be related to a blockchain transaction, but instead the storage of other types of data, blockchain data values may still include or otherwise involve the validation of a digital signature.

In traditional blockchain networks 104, the first blockchain node 106 to successfully create a block full of confirmed transactions, where the block itself can be validated (for example, the block and data reference values successfully confirmed as accurate) by a majority of other blockchain nodes 106 may be considered as the winning miner for the block. As the winning miner, mining fees paid for the transactions in that block may be paid to the winning miner, via additional blockchain data values included in the block for payment from various senders to a blockchain wallet associated with the winning miner. For instance, each transaction may be paid to the winning miner via blockchain data values included in the confirmed block, such as having the blockchain wallet associated with the winning miner as one of the recipients for every transaction to receive their mining fee.

In the system 100, blockchain nodes 106 may be required to submit bids to the processing server 102 to be able to be selected as the winning miner for a block. Each blockchain node 106 may submit a bid to the processing server 102 using any suitable communication network and method. For instance, in one embodiment, the processing server 102 may make a platform available for use by the blockchain nodes 106, such as via a web page, application program, application programming interface, etc. In another embodiment, the blockchain associated with the blockchain network 104 or an additional blockchain or sidechain may be used for the conveyance of bids, where a blockchain node 106 may submit their bid as a new blockchain data value in the blockchain. A mining bid may include at least an identifier associated with the blockchain node 106 that submitted the bid and a declaration from the miner, the declaration being a valid transaction, which sets forth how long after the fee or reward is earned by the miner is the miner willing to refrain from spending the earned fee or reward. The identifier may be a unique value associated with the blockchain node 106 for use in identification thereof, such as an identification number, serial number, registration number, internet protocol address, media access control address, etc.

In accordance with an embodiment, for example, every miner who wishes to mine the next block has to declare how much time after mining the block will the miner be willing to refrain from spending the reward or fee. This declaration by the miner would preferably be a valid transaction, i.e., the declaration will stored in a new block, to help ensure that the participating bidders know that the bids are subject to the declaration. In accordance with an exemplary embodiment, a miner (or blockchain node) with a bid that expresses a long-term commitment towards the blockchain network will have higher probability of being chosen to mine the next block and will also be validated by other eligible miners. Specifically, a miner that is willing to defer his rewards or fees will likely be more committed to the network, since a miner will to defer spending an earned reward or fee would not want the network to be compromised and negatively impact the miner in the future. In addition, the miner will also likely continuing developing the network, for at least the period of time that the miner (or blockchain node) is will to defer his spending of the earned reward or fee.

In accordance with an embodiment, if every block is mined in this manner, there will be a group of miners who still have not redeemed their rewards and will work in favor of the network. In addition, the network will be supported by the current miner who is creating the block and the miners willing to mine the upcoming blocks who are still bound to the network. In accordance with an embodiment, miners can also take into account, for example, costs in order to determine a time frame or period of time in which they are will to defer spending their rewards or fees. In addition, a long-term commitment algorithm in the form of a consensus algorithm can reduce the number of miners purchasing resources and/or using electricity since the needed resources can be minimized to start, and once the miner has started the mining cycle and has been mining regularly, the miner will start receiving rewards from previous blocks and be able to spend his previously earned rewards or fees.

In accordance with an exemplary embodiment, the declaration, for example, may be in days, weeks, or months that the blockchain node 106 (i.e., miner) is willing to delay or defer spending the rewards or fees earned by the blockchain node 106 to mine transactions and/or a block, where representation thereof may vary based on the implementation of the system 100 and the blockchain associated with the blockchain network 104. For example, a mining bid may be a bid to delay or defer spending the reward or fee for several days, several weeks, several months, or even years as a fee for all transactions, etc. In some cases, the processing server 102 may be configured to select multiple types of mining bids. For instance, a first blockchain node 106 may submit a mining bid where they will delay or defer spending the earned rewards or fees for two weeks (14 days), while a second blockchain node 106 may submit a mining bid where they will accept only a delay or deferred spending of the earned rewards or fees for one week (7 days) for all transactions. In some embodiments, the blockchain network 104 may set a period of time during which mining bids may be submitted for consideration for an upcoming block. In such embodiments, bids may be collected immediately prior to a block's confirmation, or may be collected on a rolling basis for future blocks (for example, collecting bids now for three blocks from now).

Once all of the mining bids have been collected for a block, the processing server 102 may select a winning bid. In some embodiments, the winning bid(s) may be selected randomly from each of the plurality of mining bids collected for the block. In some embodiments, the winning bid(s) may be selected based on the period of time in the declaration and wherein the winning bid(s) have the greatest period of time in which the blockchain node 106 is willing to defer spending the earned reward or fee.

In accordance with an embodiment, mining bids may be weighted based on their delay or deferred spending of the reward or fee earned. For example, if ten mining bids are collected where five mining bids have a delayed or deferred spending of the reward or fee of two weeks (14 days), while the other five mining bids have a delayed or deferred spending of the reward or fee of one week (7 days), the five mining bids that have a delayed or deferred spending of the reward or fee of two weeks (14 days) may have a higher likelihood of being selected as the winning bid.

In accordance with an example, the processing server 102 may identify an average delay or deferment of redeeming of the earned rewards or fees of all collected mining bids, and may compare the delay or deferment of the earned rewards or fees earns in each mining bid against the average to determine its weight. For instance, in the above example, each of the five mining bids that have a delay or deferment of two weeks (14 days) may have a 12% chance to be selected while the five mining bids that have a delay or deferment of one week (7 days) may have an 8% chance to be selected. In some instances, weighting may have upper and lower bounds. For instance, weighting may be such that no mining bid may have a greater than 20% chance to be selected or less than a 5% chance to be selected, such as to reduce the ability for a blockchain node 106 to have a delayed or deferment period that guarantees a winning bid. In some cases, the average delay or deferment of redeeming of the rewards or fees earned can be used for weighting. In other cases, the average delay or deferment of redeeming of the rewards or fees earned can be used for weighting may be the median of all delayed or deferments of the spending of the earned rewards or fees. Other suitable calculations and determinations for weighting may be used by the processing server 102.

In some cases, mining bids may also be weighted based on history for each blockchain node 106 selection as a winning bid. For instance, when a blockchain node 106 is selected as a winning miner, the blockchain node 106 may receive a favorable or increased weighting for selection as the winning bid in the next block based on commitment to the network 104. For example, in the above example, if one of the blockchain nodes 106 that has a mining bid with a delay or deferment of spending the earned rewards or fees earned of two weeks (14 days) won the preceding bid process, that blockchain node 106 may have its weighting increased to a 16% chance to be selected as the winning bid, for example, if a similar declaration is made to defer spending of the earned reward or fee (i.e., two weeks) and other similar bids are received, since the blockchain node 106 has shown a commitment to the network 104.

In accordance with an embodiment, blockchain nodes 106 having the greatest amount of delayed or deferred mining fees can also have its weighting increased. For example, if one blockchain node 106 has a greater amount of deferred mining fees than another blockchain node 106, the blockchain node 106 with the greatest amount of deferred mining fees can have a higher weighted percentage (i.e., 16% as compared, for example, to 12% for a blockchain node with less deferred mining fees) for bids with similar (i.e., same or equal) periods of deferment of mining fees and/or different periods of times. For example, the blockchain node with a greater amount of deferred mining fees the winning bid can be awarded the winning bid over a blockchain node with a lesser amount of deferred mining fees. Alternatively, the blockchain node with a greater amount of deferred mining fees will be awarded the winning bid over a blockchain node with a lesser amount of deferred mining fees when the submitted mining bids have equal periods of time in which each of the blockchain nodes 106 agree to defer the spending of the earned mining fee.

The processing server 102 may select a winning bid of the plurality of mining bids submitted for a block. Once the winning bid is selected, the processing server 102 may notify the blockchain node 106 that submitted the winning bid using any suitable communication network and method. In some cases, the selected winning miner may be made public, such that each blockchain node 106 may be able to identify the winning blockchain node 106 and ensure their participation and reduction of fees as bid. For instance, if a separate blockchain or sidechain is used for bids, the winning bid may be indicated in a new entry in that chain. In another example, the processing server 102 may broadcast a message to the blockchain nodes 106 in the blockchain network 104 that identifies the winning blockchain node 106, which may be distributed similar to other messages and consensus operations in the blockchain network 104.

The winning blockchain node 106 may then generate and confirm the next (for example, or other specified) block, where the mining fees collected therefrom are to be paid in accordance with their winning bid subject to the declaration of the blockchain node 106. The new block may be distributed to the other blockchain nodes 106 and confirmed using traditional methods and systems for confirmation of a new block in a blockchain. Once the new block is confirmed, it may be distributed to all of the blockchain nodes 106 in the blockchain network 104. In some embodiments, multiple blockchain nodes 106 may participate in generation of the new block where the winning blockchain node 106 may still be provided all mining fees associated therewith, such as to facilitate more efficient operation of the blockchain network 104. For example, each blockchain node 106 may still operate normally with respect to mining and confirming new blocks, but where mining fees are awarded based on the bidding process discussed herein. In some cases, some or all proof of work may be foregone in cases where bids are used to select a miner, such as to facilitate faster generation and confirmation of new blocks, provided that the data values and blocks themselves are still successfully confirmed. For instance, the identification of a nonce that results in a hash having sufficient leading zeroes, which may be performed as proof of work in many traditional blockchains to delay the addition of new blocks and force competition among miners may be skipped in the blockchain network 104.

The processing server 102 may be configured to review the blockchain data values in the new block to identify the mining fees collected by the winning blockchain node 106 that generated the block. The processing server 102 may analyze each of the blockchain data values to identify the mining fee collected by the winning blockchain node 106 and the corresponding delay or deferment of the spending of the reward or fee based on the declaration of the winning blockchain node 106. The processing server 102 can then verify if the wining blockchain node 106 complies with the delay or deferment declared in the blockchain node's winning bid and as recorded as a valid transaction.

In accordance with an embodiment, the rewards or fees can be earned and paid upon completion of the blockchain node 106 mining the block and validating the transaction and adding the block to the blockchain network 104. For example, the earned rewards or fees may be entered as a valid transaction in the blockchain network 104 (i.e., flagged such that they can be spend until after the expiration of the declared period), or alternatively, the blockchain node 106 can be responsible to insure that the earned rewards or fees are not spent until after the declared period, and may be subject to adverse consequences if the earned rewards or fees are spent prior to the expiration of the declared period. In an alternative embodiment, the blockchain node 106 may not receive the reward or fee until after the declared period in which the blockchain node 106 agreed to delay or defer spending the earned reward or fee.

The methods and systems discussed herein enable blockchain nodes 106 to bid on new blocks to be mined in a blockchain network 104, where the bids include a long-term commitment to the network.

Processing Server

FIG. 2 illustrates an embodiment of the processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102. The blockchain nodes 106 in the system 100 and illustrated in FIG. 1 may be implemented as the processing server 102 illustrated in FIG. 2 and discussed herein.

The processing server 102 may include a receiving device 202. The receiving device 202 may be configured to receive data over one or more networks via one or more network protocols. In some instances, the receiving device 202 may be configured to receive data from blockchain nodes 106, participant devices 108, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by blockchain nodes 106 that are superimposed or otherwise encoded with mining bids, new blocks for confirmation, confirmed blocks, and other data used in the performance of the blockchain network 104. The receiving device 202 may also be configured to receive data signals electronically transmitted by participant devices, which may be superimposed or otherwise encoded with new blockchain data values for confirmation and inclusion in new blocks that are generated and added to the blockchain.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may also include a memory 208. The memory 208 may be configured to store data for use by the processing server 102 in performing the functions discussed herein, such as public and private keys, symmetric keys, etc. The memory 208 may be configured to store data using suitable data formatting methods and schema and may be any suitable type of memory, such as read-only memory, random access memory, etc. The memory 208 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art based on a reading of this disclosure. In some embodiments, the memory 208 may be comprised of or may otherwise include a relational database that utilizes structured query language for the storage, identification, modifying, updating, accessing, etc., of structured data sets stored therein. The memory 208 may be configured to store, for example, cryptographic keys, salts, nonces (numbers only used once), communication information for blockchain nodes 106 and blockchain networks 104, address generation and validation algorithms, digital signature generation and validation algorithms, hashing algorithms for generating reference values, rules regarding generation of new blocks and block headers, a pool of pending transactions, mining bids, weighting algorithms and data, bid selection history, etc.

The processing server 102 may also include blockchain data 206, which may be stored in the memory 208 of the processing server 102 or stored in a separate area within the processing server 102 or accessible thereby. The blockchain data 206 may include a blockchain, which may be comprised of a plurality of blocks and be associated with the blockchain network 104. In some cases, the blockchain data 206 may further include any other data associated with the blockchain and management and performance thereof, such as block generation algorithms, digital signature generation and confirmation algorithms, communication data for blockchain nodes 106, collected mining bids, mining bid weighting and selection rules, etc.

The processing server 102 may include a querying module 214. The querying module 214 may be configured to execute queries on databases to identify information. The querying module 214 may receive one or more data values or query strings, and may execute a query string based thereon on an indicated database, such as the memory 208 of the processing server 102 to identify information stored therein. The querying module 214 may then output the identified information to an appropriate engine or module of the processing server 102 as necessary. The querying module 214 may, for example, execute a query on the memory 208 to identify weighting rules for application to collected mining bids and selection rules for selecting one of the collected mining bids as a winning bid for one or more future blocks to be confirmed in the blockchain.

The processing server 102 may also include a generation module 216. The generation module 216 may be configured to generate data for use by the processing server 102 in performing the functions discussed herein. The generation module 216 may receive instructions as input, may generate data based on the instructions, and may output the generated data to one or more modules of the processing server 102. For example, the generation module 216 may be configured to generate mining big weights, select a winning bid from a plurality of mining bids, generate blockchain data values, generate block and data reference values, generate block headers, generate blocks, etc.

The processing server 102 may also include a validation module 218. The validation module 218 may be configured to perform validations for the processing server 102 as part of the functions discussed herein. The validation module 218 may receive instructions as input, which may also include data to be used in performing a validation, may perform a validation as requested, and may output a result of the validation to another module or engine of the processing server 102. The validation module 218 may, for example, be configured to verify that a winning blockchain node 106 has complied with its winning mining bid by verifying that mining fees collected in a new block generated thereby comply with the delay or deferment of the redemption or spending of the reward or fee in accordance with their declaration. The validation module 218 may also be configured to validate block reference values, data reference values, blockchain data values, new blocks, and other data in the performance of functions associated with the blockchain network 104.

The processing server 102 may also include a transmitting device 220. The transmitting device 220 may be configured to transmit data over one or more networks via one or more network protocols. In some instances, the transmitting device 220 may be configured to transmit data to blockchain nodes 106, participant devices 108, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to blockchain nodes 106 that are superimposed or otherwise encoded with winning bid notifications, blockchain data values, new blocks, confirmed blocks, notifications regarding compliance penalties, bid acceptance dates, etc. The transmitting device 220 may also be configured to electronically transmit data signals to participant blockchain nodes 106, which may be superimposed or otherwise encoded with notifications regarding mining bids, such as information on winning mining bids (for example, declarations regarding number of days, weeks, months, or years of delay or deferment of spending an earned reward or fee by blockchain nodes 106), information on confirmed or unconfirmed transactions, and other data and notifications as part of the functions of the processing server 102 as discussed herein and as a blockchain node 106 in the blockchain network 104.

Process for Awarding Blocks in a Blockchain

Figure 3:
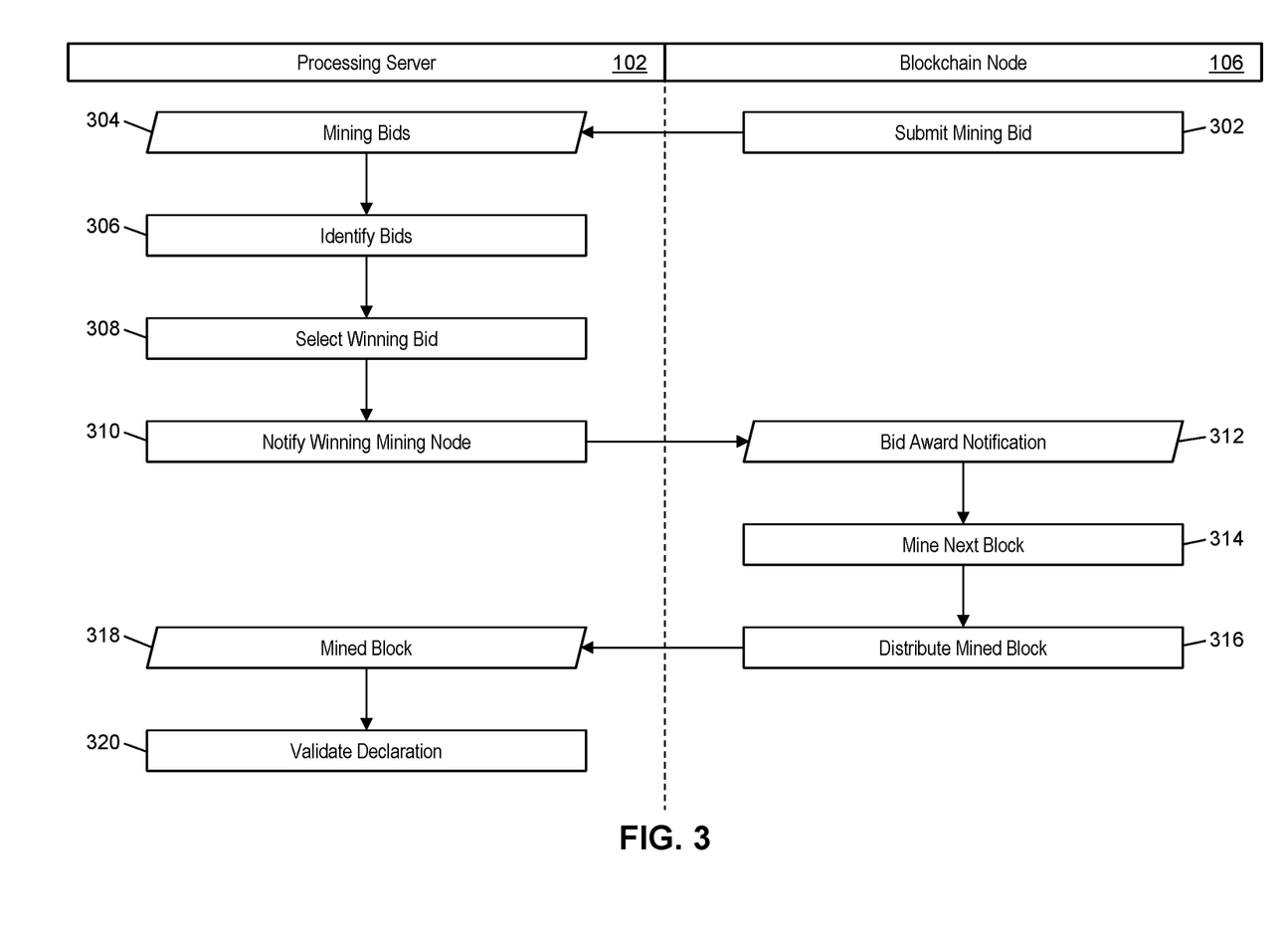
FIG. 3 is a flow diagram illustrating a process for awarding a block in a blockchain based on commitment towards a network in the system of FIG. 1 in accordance with exemplary embodiments.

FIG. 3 illustrates a process for awarding blocks in a blockchain to a blockchain node 106 in the system 100 of FIG. 1 based on selection of the blockchain node 106 as a winning miner based on an associated mining bid in a plurality of mining bids collected based on long-term commitment and delay or deferment of the spending of earned rewards or fees in the blockchain network 104 pursuant to the declaration of the blockchain node 106.

In step 302, a plurality of blockchain nodes 106 in the blockchain network 104 may submit a mining bid to the processing server 102 using a suitable communication network and method, such as via an application programming interface of the processing server 102 or a blockchain (for example, the same blockchain for which the blockchain nodes 106 are bidding for mining fees, or a separate blockchain). In latter instances, each mining bid may be digitally signed by the submitting blockchain node 106 using a private key of a cryptographic key pair associated therewith, such as the same cryptographic key pair comprising the blockchain node's blockchain wallet that may be used to collect mining fees. In step 304, the receiving device 202 of the processing server 102 may receive the mining bids, where each mining bid may include at least an identifier associated with the submitting blockchain node 106 and a declaration. The declaration being a time period in which the blockchain node will delay or defer spending an earned reward or fee. The processing server 102 may continue to receive mining bids from blockchain nodes 106 during a specified bid acceptance period.

In step 306, once any applicable bid acceptance period has completed, the processing server 102 may identify which blockchain nodes 106 have submitted bids. In step 308, the generation module 216 of the processing server 102 may select a winning bid from the plurality of mining bids collected in step 304. In some embodiments, bids with the greatest or longest period of delay or deferment in spending an earned reward or fee will be selected. Alternatively, in step 308, a determination can be made on an average period of time in which the blockchain nodes 106 agree to delay or defer spending an earned reward and fee from each of the mining bids collected from blockchain nodes 106, and each of the mining bids may be weighted based on its own period of delay or deferment as compared to the average period of delay or deferment identified in step 306. In some cases, weights may be further adjusted based on any recent selection history of the associated blockchain node 106. In cases where mining bids may be weighted, the selection of a winning bid may utilize the weighting such that weighting may give a mining bid a greater or lesser chance of being selected as compared to other mining bids based on commitment of the blockchain node 106 to the blockchain network 104. In instances where weighting is not used, for example, each mining bid have a same period of delay or deferment of spending of the earned reward or fee may have an equal chance at being selected as the winning bid. Once the winning bid has been selected, then, in step 310, the transmitting device 220 of the processing server 102 may electronically transmit a notification to the blockchain node 106 that submitted the winning bid. In some cases, notifications may also be transmitted to other blockchain nodes 106, such as to inform each node that it was not selected, and/or to inform each node of the winning blockchain node 106.

In step 312, the winning blockchain node 106 may receive the notification that it was selected as the winning bid and awarded the mining fees for the next block (for example, or other specified block or blocks). In step 314, the winning blockchain node 106 may mine the next block by confirming pending blockchain transactions and including them as the blockchain data values in a new block that is generated by the blockchain node 106 that includes a block header including a block reference value referring to the header of the preceding block in the blockchain and a data reference value that refers to the blockchain data values confirmed for the new block. The data reference values may also include the payment of mining fees to a blockchain wallet associated with the winning blockchain node 106. In step 316, the winning blockchain node 106 may distribute the mined block to other blockchain nodes 106 in the blockchain network 104 for confirmation thereof, which may further result in the block being distributed to all blockchain nodes 106 in the blockchain network 104. As part of the distribution of the newly-mined block, the block may be transmitted to or otherwise accessed by the processing server 102.

In step 318, the receiving device 202 of the processing server 102 may receive the newly mined block. In step 320, the validation module 218 of the processing server 102 validates the declaration of the winning blockchain node 106 in the blockchain. If the winning blockchain node 106 complies with their declaration, and based on the validated declaration, the blockchain node 106 may bid on future blocks in accordance with their commitment to the blockchain network 104 including increased chances of mining the next block.

Exemplary Method for Awarding Blocks in a Blockchain for Mining

Figure 4:
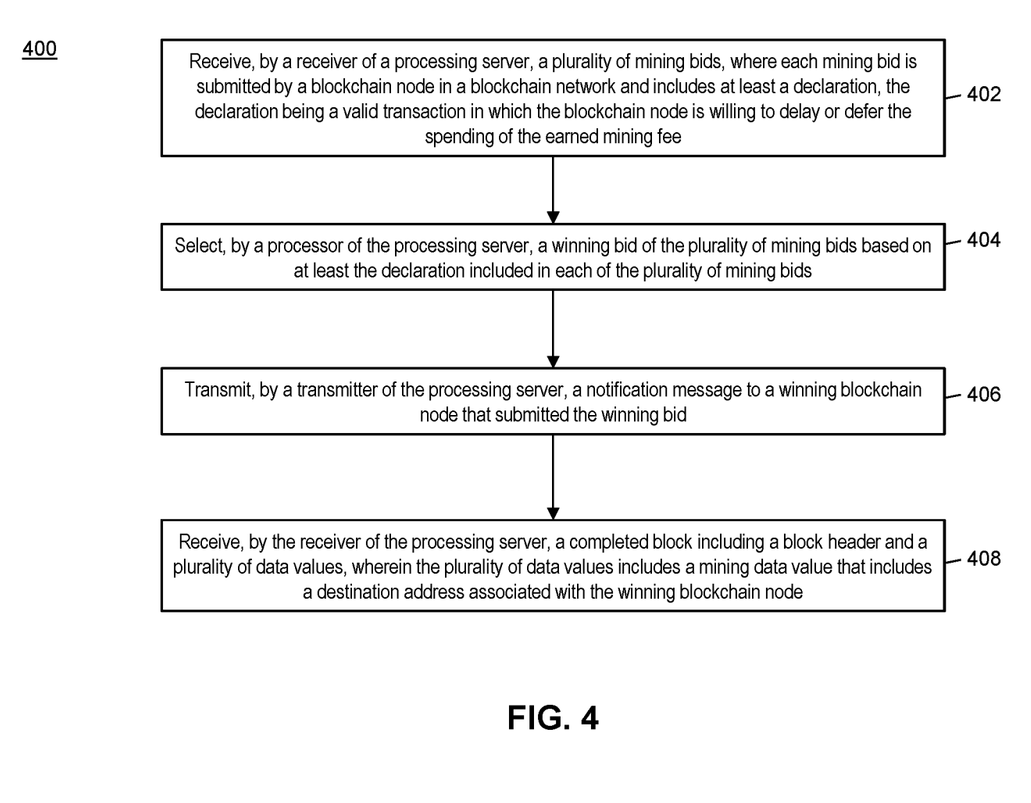
FIG. 4 is a flow chart illustrating an exemplary method for awarding blocks in a blockchain for mining based on commitment towards a network in accordance with exemplary embodiments.

FIG. 4 illustrates a method 400 for awarding blocks in a blockchain for mining based on long-term commitment and delay or deferment of the spending of rewards or fees earned in the blockchain network 104 pursuant to the declaration of the blockchain node 106.

In step 402, a plurality of mining bids may be received by a receiver (for example, the receiving device 202) of a processing server (for example, the processing server 102), where each mining bid is submitted by a blockchain node (for example, blockchain node 106) in a blockchain network (for example, the blockchain network 104) and includes at least a declaration of how long after the reward or fee is earned by the blockchain node 106 would the blockchain node 106 be willing to refrain from spending the earned reward or fee (i.e., mining fee). In step 404, a winning bid of the plurality of mining bids may be selected by a processor (for example, the generation module 216) of the processing server based on at least the declaration of delay or deferment in spending the earned reward or fees included in each of the plurality of mining bids.

In step 406, a notification message may be transmitted by a transmitter (for example, the transmitting device 220) of the processing server to a winning blockchain node that submitted the winning bid. In step 408, a completed block including a block header and a plurality of data values may be received by the receiver of the processing server, wherein the plurality of data values includes a mining data value that includes a destination address associated with the winning blockchain node. In addition, the declaration of the winning bid can be validated in the blockchain network.

In some embodiments, the method 400 may further include repeating, by the processing server, receipt of a completed block and verification of the mining fee amount in the completed block for a predetermined number of additional blocks mined by the winning blockchain node. In one embodiment, the plurality of mining bids may be stored in a blockchain associated with the blockchain network, and each mining bid may be digitally signed using a private key of a cryptographic key pair associated with the submitting blockchain node. In some embodiments, the winning bid may be selected randomly from the plurality of mining bids have a same or a similar declaration of delay or deferment of spending the earned reward or fee.

In one embodiment, each of the plurality of mining bids may be weighted for selection as the winning bid, where the weighting is based on the declaration of how long after the reward or fee is earned would the blockchain node delay or defer spending the earned reward or fee.

Computer System Architecture

FIG. 5 illustrates a computer system 500 in which embodiments of the present disclosure, or portions thereof, may be implemented as computer-readable code. For example, the processing server 102 and blockchain nodes 106 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to act as a special purpose computer to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (for example, WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (for example, random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (for example, as found in video game systems), a removable memory chip (for example, EEPROM, PROM, etc.) and associated socket, and other removable storage units 522 and interfaces 520 as will be apparent to persons having skill in the relevant art.

Data stored in the computer system 500 (for example, in the main memory 508 and/or the secondary memory 510) may be stored on any type of suitable computer readable media, such as optical storage (for example, a compact disc, digital versatile disc, Blu-ray disc, etc.) or magnetic tape storage (for example, a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (for example, an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (for example, DRAMs, etc.). These computer program products may be means for providing software to the computer system 500. Computer programs (for example, computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (for example, by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for awarding blocks in a blockchain for mining based on commitment of a miner towards the blockchain network. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for awarding blocks in a blockchain for mining based on commitment to a blockchain network, comprising:
    receiving, by a receiver of a processing server, a plurality of mining bids, where each mining bid is submitted by a blockchain node in the blockchain network and includes at least a declaration, the declaration being a period of time in which a miner agrees to defer spending an earned mining fee;
    identifying, by the processor of the processing server, an average period of time of deferment based on the period of time included in each mining bid of the plurality of mining bids;
    determining, by processor of the processing server, using weighting rules stored in memory, a weight associated with each mining bid (1) based on a history of each blockchain node selection as a winning bid and (2) by comparing the period of time of deferment included in the declaration of each mining bid against the identified average period of time of deferment;
    selecting, by a processor of the processing server, a winning bid of the plurality of mining bids based on at least the declaration included in each of the plurality of mining bids; and
    transmitting, by a transmitter of the processing server, a notification message to a winning blockchain node that submitted the winning bid.

2. The method of claim 1, further comprising:
    receiving, by the receiver of the processing server, a completed block including a block header and a plurality of data values, wherein the plurality of data values includes a mining data value that includes a destination address associated with the winning blockchain node; and
    validating the declaration of the winning bid in the blockchain network.

3. The method of claim 1, wherein the plurality of mining bids are stored in a blockchain associated with the blockchain network, and each mining bid is digitally signed using a private key of a cryptographic key pair associated with the submitting blockchain node.

4. The method of claim 1, comprising:
    selecting the winning bid randomly from the plurality of mining bids having a same period of time in which a blockchain node agrees to defer spending the earned mining fee.

5. The method of claim 1, wherein selecting the winning bid is further based on the weighting of each of the plurality of mining bids.

6. The method of claim 5, wherein the weighting has an upper bound and a lower bound for the period of time in the declaration.

7. The method of claim 5, comprising:
    weighting a blockchain node having a greater amount of deferred mining fees higher than a blockchain node with a lesser amount of deferred mining fees.

8. The method of claim 1, comprising:
    awarding the blockchain node with a greater amount of deferred mining fees the winning bid over a blockchain node with a lesser amount of deferred mining fees.

9. The method of claim 1, comprising:
    awarding the blockchain node with a greater amount of deferred mining fees the winning bid over a blockchain node with a lesser amount of deferred mining fees when the submitted mining bids have equal periods of time in which each of the blockchain nodes agree to defer the spending of the earned mining fee.

10. A system for awarding blocks in a blockchain for mining based on commitment, the system comprising:
    a blockchain network comprised of a plurality of blocks; and
    a processing server configured to:
        receive a plurality of mining bids, where each mining bid is submitted by a blockchain node in the blockchain network and includes at least a declaration, the declaration being a period of time in which a miner agrees to defer spending an earned mining fee;
        identify an average period of time of deferment based on the period of time included in each mining bid of the plurality of mining bids;
        determine, using weighting rules stored in memory, a weight associated with each mining bid (1) based on a history of each blockchain node selection as a winning bid and (2) by comparing the period of time of deferment included in the declaration of each mining bid against the identified average period of time of deferment;
        select a winning bid of the plurality of mining bids based on at least the declaration included in each of the plurality of mining bids; and
        transmit a notification message to a winning blockchain node that submitted the winning bid.

11. The system of claim 10, wherein the processing server is configured to:
    receive a completed block including a block header and a plurality of data values, wherein the plurality of data values includes a mining data value that includes a destination address associated with the winning blockchain node; and
    validate the declaration of the winning bid in the blockchain network.

12. The system of claim 10, wherein the plurality of mining bids are stored in a blockchain associated with the blockchain network, and each mining bid is digitally signed using a private key of a cryptographic key pair associated with the submitting blockchain node.

13. The system of claim 10, wherein the processing server is configured to:
    select the winning bid randomly from the plurality of mining bids having a same period of time in which a blockchain node agrees to defer spending the earned mining fee.

14. The system of claim 10, wherein the processing server is further configured to select the winning bid on a basis of the weight of each of the plurality of mining bids.

15. The system of claim 14, wherein the weighting has an upper bound and a lower bound for the period of time in the declaration.

16. The system of claim 10, wherein the processing server is configured to:
   weight a blockchain node having a greater amount of deferred mining fees higher than a blockchain node with a lesser amount of deferred mining fees.

17. The system of claim 10, wherein the processing server is configured to:
   award the blockchain node with a greater amount of deferred mining fees the winning bid over a blockchain node with a lesser amount of deferred mining fees.

18. The system of claim 10, wherein the processing server is configured to:
   award the blockchain node with a greater amount of deferred mining fees the winning bid over a blockchain node with a lesser amount of deferred mining fees when the submitted mining bids have equal periods of time in which each of the blockchain nodes agree to defer the spending of the earned mining fee.

* * * * *